Nov. 18, 1969　　　D. P. ROOME　　　3,478,391
FILM-FORMING APPARATUS
Filed April 28, 1967
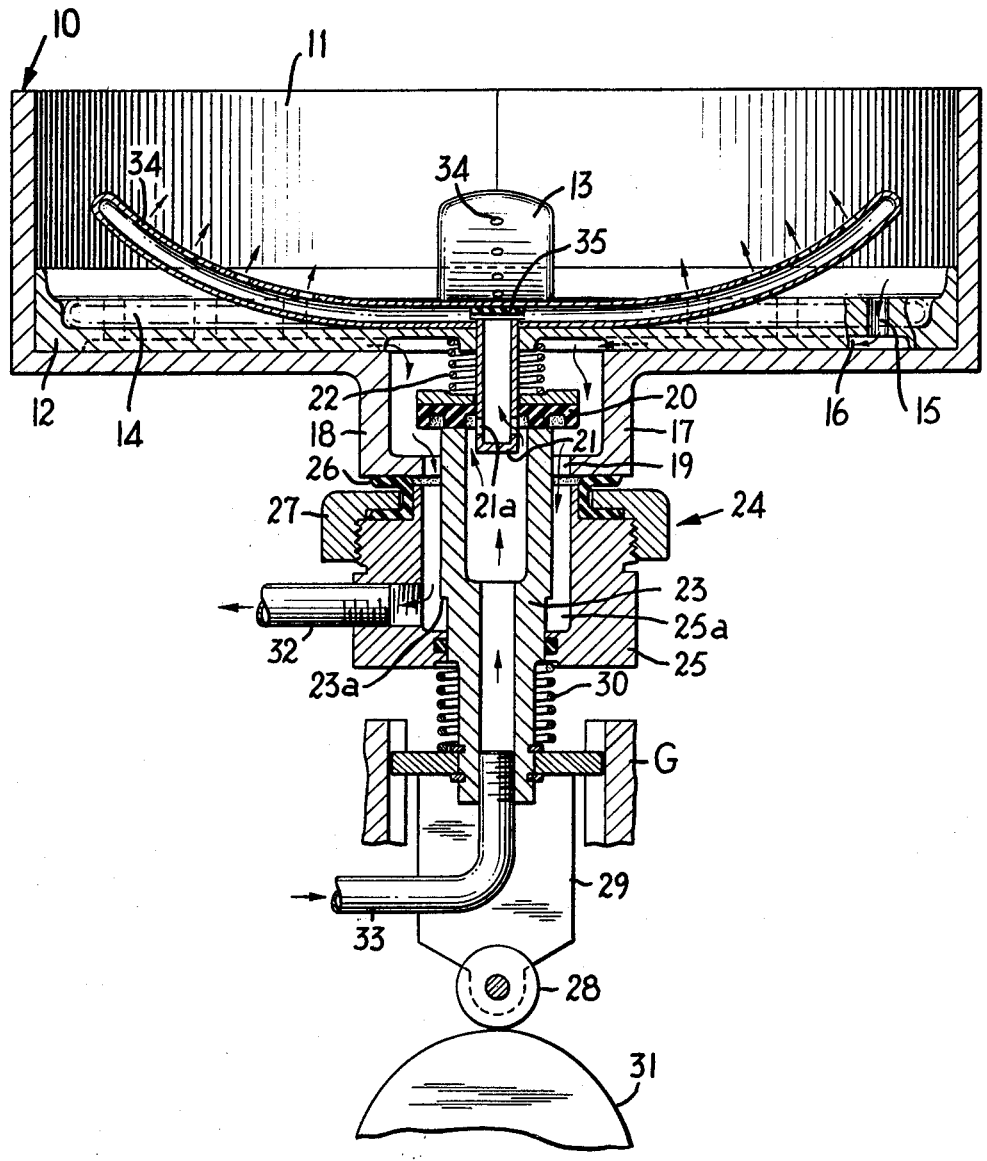
INVENTOR.
DOUGLAS P. ROOME
BY
United States Patent Office 3,478,391
Patented Nov. 18, 1969

3,478,391
FILM-FORMING APPARATUS
Douglas P. Roome, Cedar Grove, N.J., assignor to Standard Packaging Corporation, New York, N.Y., a corporation of Virginia
Filed Apr. 28, 1967, Ser. No. 634,648
Int. Cl. B29c 17/04
U.S. Cl. 18—19    11 Claims

ABSTRACT OF THE DISCLOSURE

The specification describes a film-forming apparatus of a packaging machine and method of forming the film in which a heated packaging film is drawn by suction into a film-forming cavity containing means therein for directing a film cooling fluid against a selected region of the film to retard the stretch thereof.

This invention relates to improvements in packaging machines of the type in which a film is vacuum formed in a mold or cavity, and more particularly to a novel means for controlling the stretch of the film by directing a film cooling fluid against a portion or portions of the film to retard the stretching thereof.

In certain conventional packaging machines a heated formable plastic film is placed over a mold cavity and the film is stretched into the mold cavity by vacuum to shape the film in the form of a pocket or tray. The product to be packaged, for example meat or cheese, is placed into the formed tray of the film, another plastic film is placed over the product, and the two films are heat sealed together around the periphery of the mold cavity to produce a sealed three-dimensional package. In vacuum packaging machines of this type the air is evacuated from the package through an evacuation passage and then the evacuation passage is sealed. A packaging machine of this type is shown and described in the Mahaffy et al. Patent No. 2,935,828, issued May 10, 1960.

During the vacuum forming operation the formable film may be stretched more in certain areas than in others, thereby producing a package which is thinner and weaker in the overstretched areas. For example, if the mold cavity is square or rectangular in shape, the formable film may be overstretched in the corners, thereby making the resulting package more susceptible to damage and to leakage in these weakened, overstretched areas.

The present invention provides a film-forming apparatus which overcomes these problems by providing a mold cavity having means therein to direct a cooling fluid, for example air at atmospheric pressure or air under pressure, against certain areas of the film, thereby setting or partially setting the cooled areas of the film and retarding the stretching of these areas without retarding the stretching of the other portions of the film. By thus controlling the stretching of different areas of the film it is possible to produce a vacuum formed package in which the film is drawn or stretched more uniformly over its area and without unduly weakening the corners or other overtretched areas which may tend to permit leakage.

For a more complete understanding of the present invention reference can be made to the detailed description which follows and to the accompanying drawing which shows a cross-sectional elevational view of a film-forming apparatus of a packaging machine embodying the present invention.

The film-forming apparatus of the present invention includes a mold or cup 10 having a film-forming die cavity 11 therein. The die cavity 11 contains a die filler insert block 12 secured to the bottom of the mold or cup 10 by any convenient means, such as screws, or, in the case of a die filler block made of resilient material, by a detachable snap-on coupling.

The filler block has retractable stretch controlling fluid discharge means therein in the form of four hollow resilient fingers 13 which are integral parts of the die filler. The fingers 13 are secured to the center of the insert and normally curve upwardly from the center of the die cavity toward the corners thereof. In the retracted position of the fingers they are received within complementary shaped recesses 14 formed in the top of the die filler 12. When the fingers are in their fully retracted positions the upper surfaces of the fingers cooperate with the upper surface of the die filler to define a co-planar tray-like surface which determines the shape of the portion of the formable film drawn into contact therewith. The shape of the tray-like surface can be square, rectangular, circular or any other shape in which the package is to be formed. The present invention, however, is useful chiefly where the upper tray-like surface of the die filler has corners.

The die filler 12 has a plurality of small vertical passages 15 therein which communicate through manifold passages 16 in the bottom of the die filler with a chamber 17 formed in the bottom of the mold or cup 10. The chamber 17 is defined within a small housing 18 integrally formed on the bottom of the mold or cup 10. The chamber 17 has an opening 19 at the bottom thereof which is normally closed by a spring-urged poppet valve 20 guided for vertical movement within the chamber 17 on a hollow tube 21 supported at its upper end by the die filler 12. A spring 22 on the hollow tube 21 and interposed between the poppet valve 20 and the bottom of the die filler 12 normally maintains the poppet valve in its lowermost position to close the opening 19.

The valve 20 is opened by a vertically movable valve lifting tube 23 which is part of a vertically movable cam operated assembly 24. The cam operated assembly 24 includes a hollow housing 25 in which the valve lifting tube is guided for vertical movement, a seal 26 carried at the upper end of the housing 25, a collar 27 threadably coupled to the housing 25 to anchor the seal 26, a cam follower 28 and supporting bracket 29 therefor affixed to the lower end of the valve lifting tube 23, and a compressed spring 30 on the lower end of the tube 23 and interposed between the housing 25 and the bracket 29. Vertical motion is imparted to the cam follower by a cam 31.

The cam follower 28 and the supporting bracket 29 therefor can be supported for vertical movement in guides carried by the bottom of the mold 10, in which case the cam controlled assembly 24 will be carried from station to station with the mold and the cam follower will be actuated by a stationary cam. Preferably, however, the cam follower and the supporting bracket are guided for vertical movement by stationary guides G with the assembly 24 remaining at a station of the machine to cooperate with successive molds advanced seriatim to that station, and the cam 31 is rotatable on a fixed axis below the cam follower.

When the mold or cup 10 is moved to the film-forming position of the packaging machine above the vertically movable cam operated assembly 24, the cam follower 28 is in engagement with the low part of the cam 31 so that the assembly 24 is in its lowermost inoperative position. Also, the valve lifting tube 23 is in its lowermost position in relation to the housing 25, with the shoulder 23a of the tube in engagement with the lower end of the housing. A heated, formable packaging film (not shown) is clamped to the mold or cup around the outer periphery of the die cavity 11. When the cam follower comes into engagement with a raised portion of the cam 31, the upward movement of the bracket 29 lifts the entire assembly 24 as a unit until the seal 26 engages the bottom of the housing 18 around the opening 19 thereof. Thereafter, the further upward movement of the cam follower and the supporting bracket raises the valve lifting tube 23 relative to the housing 25, causing the upper end of the valve lifting tube to engage and lift the poppet valve 20. At this stage of the operation of the apparatus the parts are in the positions shown in the drawing.

After the poppet valve 20 has been opened and the parts are in the relative positions shown in the drawing, air is evacuated from the die cavity 11 through the passages 15 and 16 to the chamber 17, through the opening 19 and a chamber 25a within the housing 25, and then through a conduit 32 in communication with a vacuum pump or other suction source.

While the air is being evacuated from the die cavity 11, cool air is admitted into the hollow fingers 13 through a conduit 33 which is in communication with either atmospheric pressure or air under pressure from a fan or blower. The air flows through the valve lifting tube 23 and, when the poppet valve 20 is raised above the ports 21a of the hollow tube 21, then through the hollow tube into the hollow fingers. The air supply conduit 33 preferably contains a valve (not shown) which is operated by a cam or other suitable timing means to insure that the air is introduced into the fingers at the appropriate time as the film drawn into the die cavity approaches the upstanding fingers 13. This same result can be insured by locating the ports 21a of the tube 21 so that they will open at the desired time in the film-forming cycle.

As the air is removed from the die cavity 11 the formable film is drawn into the mold cavity and the portions thereof drawn toward the corners of the mold cavity approach the upper surfaces of the raised fingers 13. Even before contact of the film with the upper surfaces of the raised fingers the portions of the film above the fingers are cooled by the discharge of air through the ports 34 in the upper surface of the fingers, thereby setting or partially setting these selected portions of the film. The portions of the film drawn into the cavity not directly above the fingers continue to be drawn, thus stretching to a greater degree.

The fingers 13 will gradually bend downwardly at the free ends and retract as the film continues to be drawn into the die cavity and against the fingers, and ultimately the supply of cooling air to the fingers will be shut off by the engagement of a valve or seal 35 with the upper end of the tube 21 as the fingers approach their fully retracted positions within the recesses 14. When the fingers are finally seated in their respective recesses 14, the upper surfaces of the fingers and the die filler 12 cooperate to define a continuous co-planar surface which forms the bottom of the film into the shape of a pocket or tray. The film will, of course, be thicker and stronger at the corners than would have been the case if the stretching at the corners had not been retarded by the cooling air discharged from the upper surfaces of the fingers. On the other hand, the portions of the film remote from the fingers will have been stretched to a greater degree than would have been the case if the stretching of the film toward the corners had not been retarded. The result is that overall the film will be more uniformly stretched.

When the film-forming operation has been completed, the cam follower will descend, initially lowering the valve lifting tube 23 until the valve 20 has been reseated by the spring 22 against the bottom of the housing 18 to close the opening 19. During this initial downward travel of the valve lifting tube, the housing 25 remains in position, and the spring 30 maintains the seal 26 in sealing contact with the bottom of the housing 18 to prevent atmospheric pressure from obtaining access to the interior of the die cavity 11 before the valve 20 is closed. When the shoulder 23a of the valve lifting tube reseats against the bottom of the housing 25, the further downward travel of the cam follower and its supporting bracket will separate the seal 26 from the bottom of the housing 18 so that the mold or cup 10 can be advanced to the next station of the packaging machine.

The mold or cup 10 may be advanced through several stations of the packaging machine where the suction will be reapplied to the formed film to prevent it from losing its shape. Each of these successive film-forming stations will have a means for reapplying the suction, but there will be no provision at the successive suction applying stations to supply cooling air to the interiors of the hollow fingers.

The term "cooling fluid" has been used herein to indicate a fluid having a temperature lower than the temperature of the heated film so that it will produce the desired result of setting or partially setting the film.

The invention has been shown in a preferred form and by way of example only, and obviously many variations and modifications may be made therein without departing from the spirit of the invention. The invention therefore is not to be limited to any specified form or embodiment except insofar as such limitations are set forth in the claims.

I claim:

1. A film-forming apparatus comprising a cavity in communication with a source of suction for stretching a heated formable film into the cavity, said cavity having a lower region into which a portion of the film is stretched, and means within the cavity for discharging a film cooling fluid against said portion of the film as it is stretching toward said lower region to retard the stretching of said portion of the film without retarding the stretching of other portions of the film.

2. A film-forming apparatus as set forth in claim 1 in which the fluid discharging means includes retractable stretch controlling means normally upstanding in the cavity but collapsible into the base of the cavity by the film drawn into the cavity, and means for discharging the film cooling fluid from the retractable stretch controlling means.

3. In a film-forming apparatus which includes a die cavity in communication with a source of suction for stretching a heated formable film into the cavity, the improvement of means for retarding the stretching of a selected portion of the film as the film is drawn into the cavity comprising fluid discharge means within the die cavity retractable into the base of the cavity and cooperating with the base of the cavity to define a film forming surface, and means for supplying a film cooling fluid to the said retractable fluid discharge means to cool and retard the stretching of a selected area of the film.

4. A film-forming apparatus as set forth in claim 3 in which the retractable fluid discharge means is an upstanding hollow finger resiliently connected with the base of the cavity and extending from the base upwardly toward a corner of the cavity, the said hollow finger collapsing into the base of the cavity as the film is drawn against the finger by the suction within the cavity.

5. A film-forming apparatus as set forth in claim 3 in which the fluid supplying means includes a passage through which the film cooling fluid passes in its flow to the retractable fluid discharge means, and a valve in said passage which is operatively connected to the retractable fluid discharge means to close the valve and stop the flow of cooling fluid to the finger by the downward movement of the retractable fluid discharge means.

6. A film-forming apparatus as set forth in claim 3 including means defining an opening communicating with the base of the cavity, a valve normally urged to close said opening, and means movable into sealing engagement with said opening to establish communication between the cavity and the suction source when said valve is open, and in which the fluid supplying means includes a valve lifting tube engageable with said valve to open it and connect the cavity with the suction source, means connecting the valve lifting tube with a source of film cooling fluid, and means establishing communication between the valve lifting tube and the fluid discharge means within the cavity.

7. In a film-forming apparatus which includes a die cavity into which a heated formable film is stretched by suction comprising fluid discharge means within the cavity to direct a film cooling fluid toward areas of the film stretched toward the corners of the cavity, means defining a chamber communicating with the bottom of the cavity, a conduit within the chamber and connected with said fluid discharge means within the cavity, means defining an opening communicating with the chamber, a valve normally urged to a position closing the chamber opening, means in communication with a source of suction and movable into sealing engagement with said chamber opening, and a valve lifting tube in communication with a source of film cooling fluid and initially engageable with said valve to open it, thereby connecting the cavity with the suction source to draw the film into the cavity, and then movable into connection with the conduit to supply film cooling fluid to the fluid discharge means within the cavity.

8. A film-forming apparatus as set forth in claim 7 in which the fluid discharge means are retractable from raised positions within the cavity to positions recessed in the base thereof as the film is drawn further into the cavity, and valve means for cutting off the flow of film cooling fluid in response to the downward movement of the retractable fluid discharge means.

9. A film-forming apparatus as set forth in claim 7 in which the retractable fluid discharge means are hollow fingers resiliently connected with the base of the cavity and extending from the base upwardly towards corners of the cavity and collapsible into the base of the cavity as the film is drawn against the fingers by suction within the cavity, and means for discharging the film cooling fluid from the upper surfaces of the said fingers.

10. A film-forming apparatus as set forth in claim 7 in which the valve normally closing the chamber opening is guided for movement on part of said conduit and including ports in the conduit and communicating with the valve lifting tube when the valve is raised to a position to expose them to the tube.

11. A film-forming apparatus comprising a cavity in communication with a source of suction for stretching a heated formable film into the cavity, said cavity having at least one corner therein, and means for discharging a film cooling fluid against that portion of the film which is being stretched toward said corner to retard the stretching of that portion of the film without retarding the stretching of other portions of the film which are not being stretched toward a corner.

References Cited

UNITED STATES PATENTS

| | | | |
|---|---|---|---|
| 3,114,596 | 12/1963 | Wechsler et al. | 264—327 XR |
| 3,121,767 | 2/1964 | Welshon | 264—327 XR |

FOREIGN PATENTS 1,141,436   12/1962   Germany.

WILLIAM J. STEPHENSON, Primary Examiner